US006952012B2

(12) United States Patent
Bai et al.

(10) Patent No.: US 6,952,012 B2
(45) Date of Patent: Oct. 4, 2005

(54) AMBIENT PRESSURE MATRIX-ASSISTED LASER DESORPTION IONIZATION (MALDI) APPARATUS AND METHOD OF ANALYSIS

(75) Inventors: Jian Bai, Mountain View, CA (US); Steven M. Fischer, Hayward, CA (US); J. Michael Flanagan, Sunnyvale, CA (US)

(73) Assignee: AgilentTechnologies, Inc., Palo Alto, CA (US)

( * ) Notice: Subject to any disclaimer, the term of this patent is extended or adjusted under 35 U.S.C. 154(b) by 0 days.

(21) Appl. No.: 10/806,908

(22) Filed: Mar. 22, 2004

(65) Prior Publication Data

US 2004/0217283 A1 Nov. 4, 2004

Related U.S. Application Data

(63) Continuation of application No. 09/146,817, filed on Sep. 4, 1998, now Pat. No. 6,849,847.

(60) Provisional application No. 60/089,088, filed on Jun. 12, 1998.

(51) Int. Cl.[7] ........................... B01D 59/44; H01J 49/00

(52) U.S. Cl. ................... 250/288; 250/281; 250/423 R; 250/423 P

(58) Field of Search ................................ 250/281, 288, 250/423 R, 423 P

(56) References Cited

U.S. PATENT DOCUMENTS 5,192,865 A * 3/1993 Zhu ........................... 250/288
5,210,412 A * 5/1993 Levis et al. ................. 250/288

* cited by examiner

*Primary Examiner*—John R. Lee
*Assistant Examiner*—Paul M. Gurzo

(57) ABSTRACT

A mass spectrometer having a matrix-assisted laser desorption ionization (MALDI) source which operates at ambient pressure is disclosed. The apparatus and method are disclosed to analyze at least one sample which contains at least one analyte using matrix-assisted laser desorption ionization (MALDI), which apparatus comprises:
The present invention relates to an apparatus and a method for ionizing at least one analyte in a sample for delivery to a mass analysis device, comprising:

(a) an ionization enclosure including a passageway configured for delivery of ions to the mass analysis device;

(b) means to maintain said ionization enclosure at an ambient pressure of greater than 100 mTorr;

(c) a holder configured for maintaining a matrix containing said sample in the ionization enclosure at said ambient pressure;

(d) a source of laser energy including means associated with the ionization enclosure for directing the laser energy onto said matrix maintained by the holder at the ambient pressure to desorb and ionize at least a portion of the analyte in the sample, and (e) means for directing at least a portion of the at least one ionized analyte into the passageway. The ambient pressure (AP-MALDI) source is compatible with various mass analyzers, particularly with mass spectrometers and solves many problems associated with conventional MALDI sources operating under vacuum. Atmospheric pressure MALDI is described. The analysis of organic molecules or fragments thereof, particularly biomolecules, e.g., biopolymers and organisms, is described.

21 Claims, 10 Drawing Sheets

AMBIENT PRESSURE MATRIX-ASSISTED LASER DESORPTION IONIZATION (MALDI) APPARATUS AND METHOD OF ANALYSIS

RELATED APPLICATIONS

This application is a continuation of U.S. Ser. No. 09/146,817, filed Sep. 4, 1998, now U.S. Pat. No. 6,849,847, which claims benefit of provisional patent application Ser. No. 60/089,088, filed Jun. 12, 1998 which is incorporated herein by reference in its entirety.

BACKGROUND OF THE INVENTION

1. Field of the Invention

The invention relates to the field of mass spectrometry, and more particularly to a matrix-assisted laser desorption ionization (MALDI) source for mass spectrometry at about atmospheric pressure. This invention is useful to obtain structural data of compounds especially large complex species.

2. Description of Related Art

A mass spectrometer generally contains the following components:

(1) an optional device to introduce the sample to be analyzed (hereinafter referred to as the "analyte"), such as a liquid or gas chromatograph, direct insertion probe, syringe pump, autosampler or other interfacing device;

(2) an ionization source which produces ions from the analyte;

(3) at least one analyzer or filter which separates the ions according to their mass-to-charge ratio (m/z);

(4) a detector which measures the abundance of the ions; and (5) a data processing system that produces a mass spectrum of the analyte.

There are a number of different ionization sources which are commonly utilized depending upon the type of analyte, including electron impact, chemical ionization, secondary ion mass spectrometry (hereinafter referred to as "SIMS"), fast ion or atom bombardment ionization (hereinafter referred to as "FAB"), field desorption, plasma desorption, laser desorption (hereinafter referred to as "LD"), and matrix-assisted laser desorption ionization (hereinafter referred to as "MALDI"), particle beam, themospray, electrospray (hereinafter referred to as "ESI"), atmospheric pressure chemical ionization (hereinafter referred to as "APCI"), and inductively coupled plasma ionization.

FAB, ESI and MALDI are particularly useful for the mass analysis and characterization of macromolecules, including polymer molecules, bio-organic molecules (such as peptides, proteins, oligonucleotides, oligosaccharides, DNA, RNA) and small organisms (such as bacteria). MALDI is generally preferred because of its superior sensitivity and greater tolerance of different contaminants such as salts, buffers, detergents and because it does not require a preliminary chromatographic separation.

In the MALDI method, the analyte is mixed in a solvent with small organic molecules having a strong absorption at the laser wavelength (hereinafter referred to as the "matrix"). The solution containing the dissolved analyte and matrix is applied to a metal probe tip or sample stage. As the solvent evaporates, the analyte and matrix co-precipitate out of solution to form a solid solution of the analyte in the matrix on the surface of the probe tip or sample stage. The co-precipitate is then irradiated with a short laser pulse inducing the accumulation of a large amount of energy in the co-precipitate through electronic excitation or molecular vibrations of the matrix molecules. The matrix dissipates the energy by desorption, carrying along the analyte into the gaseous phase. During this desorption process, ions are formed by charge transfer between the photoexcited matrix and the analyte.

The most common type of mass analyzer used with MALDI is the time-of-flight (hereinafter referred to as "TOF") analyzer. However, other mass analyzers, such as ion trap, ion cyclotron resonance mass spectrometers and quadrupole time-of-flight (QTOF) may be used. These mass analyzers must operate under high vacuum, generally less than $1\times10^{-5}$ torr. Accordingly, conventional MALDI sources have been operated under high vacuum. This requirement introduces many disadvantages including inter alia:

(1) changing the sample holder requires breaking the vacuum which severely limits sample throughput and generally requires user intervention.

(2) the amount of laser energy used must be kept to a minimum to prevent a broadening of the energy spread of the ions which reduces resolution and capture efficiency;

(3) the positional accuracy and flatness of the sample stage is critical to the mass assignment accuracy and resolution;

(4) it is difficult to test analytes directly on surfaces which are not compatible with high vacuum conditions, including such surfaces as electrophoresis gels and polymer membranes which often shrink under high vacuum conditions; and (5) tandem mass spectrometry analysis by TOF is relatively difficult and expensive.

Thus, it would be advantageous to develop a MALDI which operates at about atmospheric pressure yet is still compatible with various mass analyzers to solve the above-described problems. However, no one has heretofore constructed a MALDI source which operates at ambient pressure.

There have been some efforts by others to develop other types of ionization sources which operate at atmospheric pressure.

(a) ESI is a method wherein a solution of the analyte is introduced as a spray into the ion source of the mass spectrometer at atmospheric pressure. The liquid sample emerges from a capillary that is maintained at a few kilovolts relative to its surroundings, whereby the resultant field at the capillary tip charges the surface of the liquid dispersing it by Coulomb forces into a spray of charged droplets. While ESI is a powerful ionization method for macromolecules and small molecules, it is a dynamic method wherein analyte ions are formed in a flowing electrospray. By contrast, MALDI is a pulsed technique wherein ionization of the analyte occurs via a transfer of charge (often a proton) between the absorbing matrix which is irradiated by a pulsed laser of the proper wavelength. Although the MALDI method is inherently more qualitative, its strengths lie in its ability to analyze compounds directly, often in complex biological matrices without extensive sample preparation and/or prior separation. Moreover, MALDI provides ions of low charge states, mostly singly and doubly charged quasi-molecular ions, whereas electrospray ionization often produces multiple charge states (charge envelope), particularly for large biomolecules such as proteins.

(b) U.S. Pat. No. 4,527,059 discloses a mass spectrometer having a sample holder mounted on the outside of the vacuum chamber of a mass analyzer. The sample holder exposes the sample to atmospheric pressure or an inert gas environment and is constructed with a polymer carrier film on which the analyte is deposited and which forms part of a wall of the vacuum chamber of the mass spectrometer. The laser is directed onto the analyte causing the analyte to evaporate and simultaneously forming a hole in the carrier film through which the evaporated analyte is transferred into the vacuum chamber. The mass spectrometer uses an ionization source which works on a surface-specific basis, such as SIMS, FAB, and a laser-activated micromass analyzer. This is a laser evaporation/ionization device that is not matrix-assisted.

(c) U.S. Pat. No. 4,740,692 discloses an apparatus using two lasers to produce ions. A first laser is used to vaporize a sample under atmospheric pressure. The second laser is used to ionize the vaporized sample after the vaporized sample enters the vacuum system. While some of the vaporized sample may ionize when the first laser is used under atmospheric pressure, the ions quickly neutralize from interactions with the background gas. This is a laser desorption/ionization device that is not matrix-assisted.

(d) U.S. Pat. No. 5,045,694 discloses a method and instrument for the laser desorption of ions in mass spectrometry. The method teaches the use of matrix compounds which strongly absorb photons from a UV laser beam operating at wavelengths between 200–600 nm, preferably 330–550 nm. Large organic molecules with masses greater than 10,000Dalton to 200,000 Dalton or higher are analyzed with improved resolution by deflecting low mass (<10,000 Dalton) ions. Both positive and negative ions can be analyzed with reduced fragmentation. The device consists of a TOF mass spectrometer having a MALDI source with a sample probe that is inserted into the vacuum chamber of the mass spectrometer. Analyte ionization occurs by the MALDI process at the sample probe's tip within the vacuum chamber of the mass spectrometer.

(e) U.S. Pat. No. 5,118,937 discloses a process and device for the laser desorption of analyte molecular ions, especially biomolecules. Specific matrices and lasers are employed. The device consists of a TOF mass spectrometer having a MALDI source with a specimen support located within the vacuum chamber of the mass spectrometer or intrinsic to the vacuum chamber wall of the mass spectrometer. Analyte ionization occurs within the vacuum chamber of the mass spectrometer.

(f) U.S. Pat. No. 5,663,561 discloses a device and method for the ionization of analyte molecules at atmospheric pressure by chemical ionization which includes:

(1) codepositing the analyte molecules together with a decomposable matrix material (cellulose tinitrate or trinitrotoluene form a preferred class) on a solid support;

(2) decomposing the matrix with a laser and thereby blasting the analyte molecules into the surrounding gas;

(3) ionizing the analyte molecules within the gas stream by APCI using reactant ions formed in a corona discharge.

Unlike MALDI, this method requires that the desorption of the analyte be carried out as a separate step from the ionization of the analyte.

Some other U.S. Patents of specific interest include but are not limited to:

| Inventor | U.S. Pat. No. | Issue Date |
|---|---|---|
| Gray | 3,944,826 | Mar. 16, 1976 |
| Renner et al. | 4,209,697 | Jun. 24, 1980 |
| Carr et al. | 4,239,967 | Dec. 16, 1980 |
| Brunnee et al. | 4,259,572 | Mar, 31, 1980 |
| Stuke | 4,686,366 | Aug. 11, 1987 |
| Lee et al. | 5,070,240 | Dec. 3, 1991 |
| Kotamori et al. | 5,164,592 | Nov. 17, 1992 |
| Cottrell et al. | 5,260,571 | Nov. 9, 1993 |
| Buttrill, Jr. | 5,300,774 | Apr. 5, 1994 |
| Levis et al. | 5,580,733 | Dec. 3, 1996 |
| Vestal et al. | 5,625,184 | Apr. 29, 1997 |
| Sakain et al. | 5,633,496 | May 27, 1997 |

Other references of interest include:

M. Karas, et al. *International Journal of Mass Spectrometry and Ion Processes,* 78, (1987) 53–68. "Matrix-Assisted Ultraviolet Laser Desorption of Non-volatile Compounds".

K. Tanaka, et al. *Rapid Communications in Mass Spectrometry,* 2, (1988) 151.

F. Hillenkamp, *Analytical Chemistry,* 20, (1988), 2299–3000 (Correspondence). "Laser Desorption Ionization of Proteins with Molecular Masses Exceeding 10000 Daltons".

M. Karas, et al. *International Journal of Mass Spectrometry and Ion Processes,* 92, (1989) 231–242. "UV Laser Matrix Desorption/Ionization Mass Spectrometry of Proteins in the 100000 Dalton Range".

R. Beavis, et al. "Cinnamic Acid Derivatives as Matrices for Ultraviolet Laser Desorption Mass Spectrometry of Proteins". *Rapid Communications in Mass Spectrometry,* 3, (1989) 432–435.

M. Karas, et al. *Analytica Chimica Acta,* 241, (1990) 175–185. "Principles and applications of matrix-assisted UV-laser desorption/ionization mass spectrometry".

A. Overberg, et al. *Rapid Communications in Mass Spectrometry,* 8, (1990) 293–296. "Matrix-assisted Infrared-laser (2.94 μm) Desorption/Ionization Mass Spectrometry of Large Biomolecules".

B. Spengler, et al., *Rapid Communications in Mass Spectrometry,* 9, (1990) 301–305. "The Detection of Large Molecules in Matrix-assisted UV-laser Desorption".

S. Berkenkamp, et al., *Proceedings National Academy of Sciences USA,* 93, (1996) 7003–7007. "Ice as a matrix for IR-matrix-assisted laser desorption/ionization: Mass spectra from a protein single crystal".

J. Qin, et al., Analytical Chemistry, 68, (1996) 1784–1791. "A Practical Ion Trap Mass Spectrometer for the Analysis of Peptides by Matrix-Assisted Laser Desorption/Ionization".

S. Niu, et al., American Society for Mass Spectrometry, 9, (1998) 1–7. "Direct Comparison of Infrared and Ultraviolet Wavelength Matrix-Assisted Laser Desorption/Ionization Mass Spectrometry of Proteins".

D. P. Little et al., *Analytical Chemistry,* 22, (1997), 4540–4546 "MALDI on a Chip: Analysis of Arrays of Low-Femtomole to Subfemtomole Quantities of Synthetic Oligonucleotides and DNA Diagnostic Products Dispensed by a Piezoelectric Pipet."

Applicants have discovered that a MALDI source may effectively operate at ambient pressure and that such an apparatus is particularly useful for the analysis of organic molecules, such as but not limited to small and large organic compounds, organic polymers, organometallic compounds and the like. Of particular interest are biomolecules and fragments thereof including but not limited to biopolymers such as DNA, RNA, lipids, peptides, protein, carbohydrates—natural and synthetic organisms and fragments thereof such as bacteria, algae, fungi, viral particles, plasmids, cells, and the like.

SUMMARY OF THE INVENTION

The invention is directed to a mass spectrometer having a MALDI source which operates at atmospheric pressure (hereinafter referred to as "AP-MALDI source"). The AP-MALDI source is compatible with various mass analyzers and solves many problems associated with conventional MALDI sources operating under vacuum.

In one embodiment, the present invention relates to an apparatus for ionizing at least one analyte in a sample for delivery to a mass analysis device, comprising:

(a) an ionization enclosure including a passageway configured for delivery of ions to the mass analysis device;

(b) means to maintain the ionization enclosure at an ambient pressure of greater than 100 mTorr;

(c) a holder configured for maintaining a matrix containing the sample in the ionization enclosure at said ambient pressure;

(d) a source of laser energy including means associated with the ionization enclosure for directing the laser energy onto said matrix maintained by the holder at the ambient pressure to desorb and ionize at least a portion of the analyte in the sample, and (e) means for directing at least a portion of the at least one ionized analyte into the passageway.

In another embodiment, the present invention relates to an apparatus for mass analysis of at least one analyte in a sample, comprising:

(a) an ion source having an ionization enclosure and a mass analysis device having a mass analysis enclosure, the ionization enclosure being connected with the mass analysis enclosure through a passageway configured for delivery of ions from the ion source to the mass analysis device, the ion source including:

(1) a holder configured for maintaining a matrix containing a sample in the ionization enclosure at the ambient pressure;

(2) means associated with the ionization enclosure for directing laser energy onto a matrix maintained by the holder at the ambient pressure to desorb and ionize at least a portion the at least one analyte in the sample, and (3) means for directing at least a portion of the ionized analyte into the passageway; and (b) means to maintain the ionization enclosure at an ambient pressure greater than 100 mTorr optionally while maintaining the mass analysis enclosure at a pressure less than $10^{-5}$ Torr.

In still another embodiment, the present invention relates to a method for preparing for mass analysis a sample that may contain at least one analyte, comprising:

(a) providing a matrix containing the sample; and (b) maintaining the matrix containing the sample in a condition of ambient pressure greater than 100 mTorr while directing laser energy onto the matrix to desorb and ionize at least a portion of the at least one analyte, and (c) directing at least a portion of the ionized at least one analyte into a mass analysis device.

In another embodiment the present invention relates to a method for analyzing a sample that may contain at least one analyte comprising:

(a) providing a matrix containing the sample;

(b) maintaining the sample matrix in a condition of ambient pressure greater than 100 mTorr while directing laser energy onto the matrix to desorb and ionize at least a portion of the at least one analyte;

(c) directing at least a portion of the ionized at least one analyte into a mass analysis device, and (d) mass analyzing the portion of the at least one analyte that is received by the mass analysis device.

In yet an another embodiment, the present invention concerns a method for the mass spectrometric analysis of ions produced by matrix-assisted laser desorption and ionization of at least one analyte in a sample, wherein the improvement comprises conducting the matrix-assisted desorption and ionization at an ambient pressure greater than 100 mTorr.

In still another embodiment, the present invention concerns a mass analysis apparatus including a matrix-assisted laser desorption and ionization (MALDI) source and a mass analysis device that receives and analyzes ions from the MALDI source, wherein the improvement comprises means for maintaining the MALDI source at an ambient pressure greater than 100 mTorr during the ionization and analysis.

None of the herein above cited patents or articles teach or suggest the present invention of an apparatus and a method to conduct a MALDI analysis at or about atmospheric pressure.

The references, articles and patents described herein are hereby incorporated by reference in their entirety. In particular the reported MALDI references or patents, when read in conjunction with the disclosure in the text, claims and figures of this patent application, can be adapted to obtain a large number of AP-MALDI configurations at or near ambient pressure or at or near atmospheric pressure.

BRIEF DESCRIPTION OF THE DRAWINGS

FIG. 4A is capture No. 1 at 0 seconds. FIG. 4B to FIG. 4J continue at the specific capture times shown in FIGS. 4B to 4J. The vertical axis designation on FIGS. 4A to 4J

FIGS. 5A to 5J show selected ion monitoring (SIM) signal of m/z 1900 (background) obtained with a quadrupole mass spectrometer also acquiring data every 25 microseconds.

FIG. 6A shows total ion chromatogram (TIC) as the laser was moved across the sample spot. FIG. 6B shows a 1.25 seconds averaged scan (m/z 300–1700) acquiring data every 250 milliseconds.

DETAILED DESCRIPTION OF THE INVENTION AND PREFERRED EMBODIMENTS

Definitions

Figure 1:
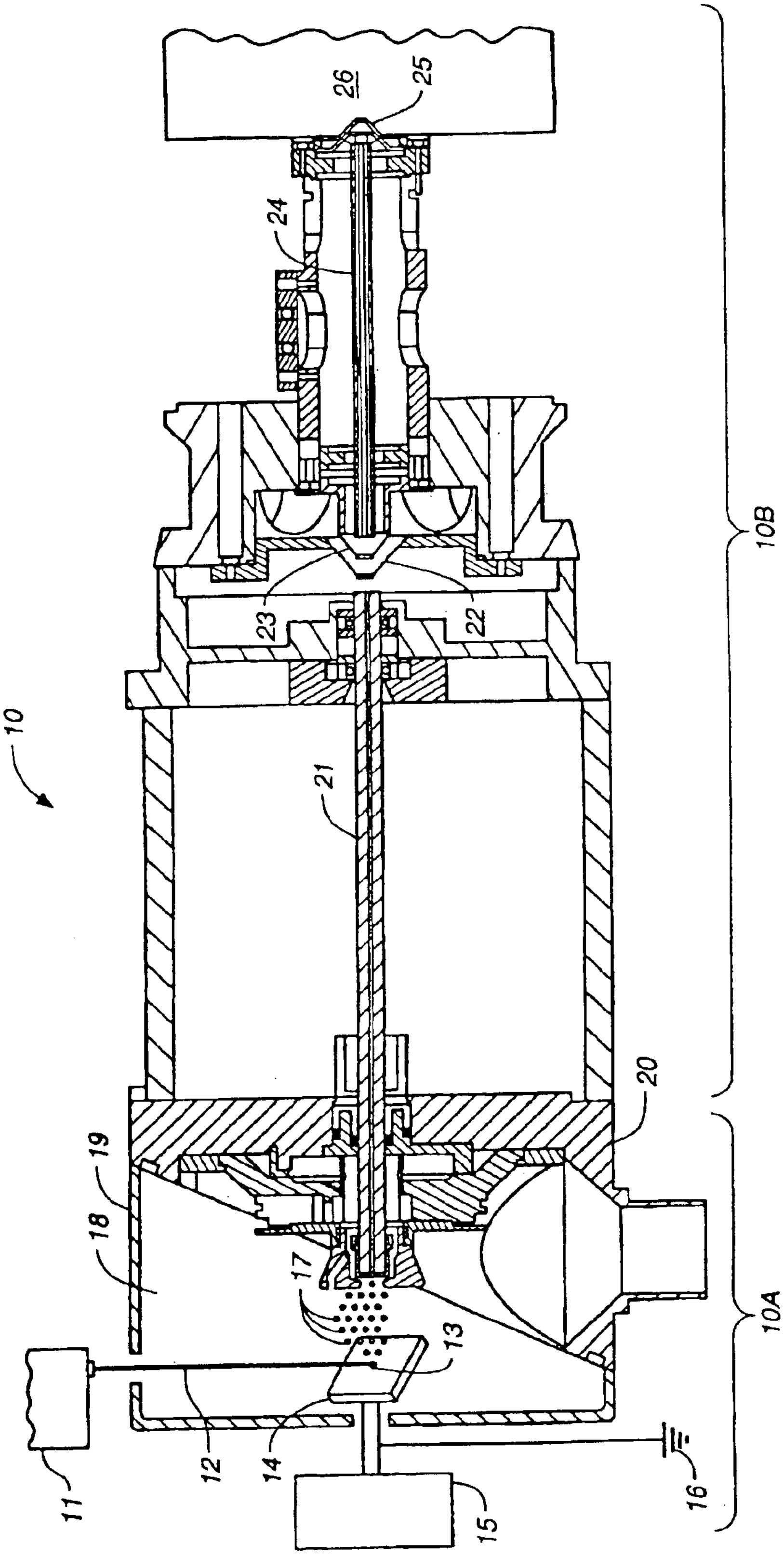
FIG. 1 shows schematic diagram of a mass spectrometer having a MALDI source which operates at ambient pressure. (See below).

As used herein:

"Ambient pressure" refers to the existing pressure within the enclosure of the AP-MALDI apparatus. The enclosure generally may have small openings or ports. However, the enclosure may also be sealed. The ambient pressure is greater than 100 mTorr, and maybe much higher, such as greater than 1 Torr, 100 Torr, 1000 Torr, 2500 Torr and at pressures intermediate to 100 mTorr and 2500 mTorr. It is understood that pressures above 760 Torr mean that the system is under a positive pressure.

"Atmospheric pressure" is a subset of "ambient pressure" and refers to the normal air pressure, e.g. 760 mm Hg at sea level. Near or about atmospheric pressure refers to pressures that are between about +15% and −15% of atmospheric pressure, preferably between about +10% and −10% more preferably between about +5% and −5%. Atmospheric pressure is most preferred. In some cases, a positive pressure (e.g. inert gas) is on the system to control the flow.

"Ambient temperature" or "atmospheric temperature" is about 20° C.±10° C.

"Flowing" refers to a liquid sample or matrix which is moving and from which the sample and matrix is analyzed.

"Holder" refers to a holder for a sample and matrix in this art. Holder includes, but is not limited to, location on a surface; on or in one or more wells of a multi-well microtitre plate; on a microchip array; on or from a thin layer chromatographic plate; on, in or from an electrophoresis gel, on or from a membrane, or combinations thereof. "Holder" also refers to an interface for introducing a moving liquid e.g., the effluent from a HPLC or CE a syringe pump and the like.

"Location of sample" refers to the situation wherein the said at least one analyte in a matrix is located on a surface; on or in one or more wells of a multi-well microtitre plate; microchip array; on or from a thin layer chromatographic plate; on, in or from an electrophoresis gel, on or from a membrane, or combinations thereof.

"Matrix" refers to any solid or liquid molecules having the ability to transfer or receive a charge from the analyte and an absorption at the wavelength of the laser, such as ultraviolet (UV), (electronic), visible (VIS) or infrared (IR) (vibrational and/or rotational) or combinations thereof. For an ultraviolet laser, substituted aromatic compounds are used which can transfer or receive a change to or from the analyte. For an infrared laser, aliphatic organic compounds, hydrocarbons, aliphatic organic compounds which contain heteroatoms such as oxygen, nitrogen, sulfur, and combinations thereof, water and combinations of these compounds which can transfer to or receive a charge from the analyte are suitable.

"Means for maintaining ambient (or atmospheric) pressure" refers to methods and equipment which are currently available. These include but are not limited to (1) a passageway and/or associated ion optics which restricts the gas flow from the ionization enclosure to the mass analyzer enclosure; (2) gas which is introduced to the ionization enclosure to produce above ambient pressure and optionally above atmospheric pressure; (3) a gas which is introduced to the ionization enclosure which entrains and carries the ionized analytes into the passageway; (4) a separate pump to create the greater than 100 mTorr pressure and the like.

"Static" refers to a sample or matrix which is not moving at the time of analysis.

In one aspect, the reference of A. Krutchinsky, et al., in Rapid Communications in Mass Spectrometry, 12, (1998) 508–518. "Orthogonal Injection of Matrix-assisted Laser Desorption/Ionization Ions into a Time-of-flight Spectrometer Through Collisional Damping Interface" is of interest. It discusses the effect of ion collisional damping on mass analysis at ion source pressures of 10–100 mTorr.

Construction of the AP-MALDI Source

The AP-MALDI source contains the following:

(a) a surface for depositing the matrix/analyte mixture;

(b) a laser to desorb and ionize the matrix/analyte mixture;

(c) a passageway from the AP-MALDI source to ion optics and mass analyzer/detector; and (d) means for ions produced from the matrix/analyte mixture to be extracted are drawn into the passageway from the AP-MALDI source (such as a potential gradient, a gas to entrain, a vacuum system to draw and the like).

Suitable surfaces for depositing the matrix/analyte mixture include a probe tip, sample stage and the like. The probe tip or sample stage may be constructed from a number of materials including metals (such as stainless steel, gold, silver, aluminum, and the like), semiconductors (e.g. silicon), and insulators (such as quartz, glass or polymers, e.g. PDVF (or PU defined below)).

Suitable lasers include UV, VIS, and IR lasers such as nitrogen lasers, $CO_2$ lasers, Er-YAG lasers, Nd-YAG, Er-YILF, Er-YSGG and the like. Typical laser energies which are useful in AP-MALDI analysis of biopolymers are $10^6$–$10^8$ watts/cm$^2$. Typical laser wavelengths are 200–600 nm (UV-VIS wavelengths) and 1.4–12 $\mu$m (IR wavelengths), preferably 1.4–4 $\mu$m.

The passageway from the AP-MALDI source to the ion optics and mass analyzer/detector may be an ion sampling orifice, capillary or the like. The term "passageway" as used in this application, means "ion transport guide" in any form whatever. It is possible that the passageway be of such short length relative to the opening diameter that it may be called an orifice. Other ion transport guides including capillary(s), multiple ion guide(s), skimmer(s), lense(s) or combinations thereof which are or may come to be used can operate successfully in this invention.

The potential gradient may be produced by holding the probe tip or sample stage at ground potential and applying a high voltage to the passageway; by applying a high voltage to the probe tip or sample stage and holding the passageway at ground potential; or any other arrangement which would establish a potential gradient between the entrance to the passageway and the probe tip or sample stage and cause the ions produced to be drawn toward the passageway entrance.

Operation of the AP-MALDI Source

For sample preparation, the analyte may be co-crystallized with the matrix, embedded in a layer of matrix material on a solid support, or may be deposited on top of a matrix layer. The solution containing the dissolved analyte and matrix is applied to a probe tip or sample stage. The matrix, which may be composed of any small molecules which absorb energy at the wavelength of the laser, is capable of transferring charge to the analyte following absorption. Suitable matrix materials include cinnamic acid derivatives (such as α-cyano-4-hydroxycinnamic acid and sinapinic acid), dihydroxybenzoic acid derivatives (such as 2,5-dihydroxybenzoic acid), nicotinic acid, sugars, glycerol, water and the like. Suitable solvents include methanol, acetonitrile, water and the like. The analyte matrix may be a liquid such as water or alcohol e.g methanol, or a solid such as ice.

The analyte in a matrix in one embodiment is located on a surface; on or in one or more wells of a multi-well microtitre plate or a microchip array; on or from a thin layer chromatographic plate; on, in or from an electrophoresis gel, on or from an electroblotted membrane, or combinations thereof. In another embodiment, the sample holding means is any conventional single or multi-chambered containment article. The sampling may occur using a static or a flowing liquid sample, such as the effluent from an HPLC, CE, or syringe pump.

The laser is operated at ultraviolet (UV), visible (VIS), or infrared (IR) wavelengths or combinations thereof. The operation of the AP-MALDI configuration and/or sampling occurs in air, helium, nitrogen, argon, oxygen, carbon dioxide, or combinations thereof. It is also in an inert environment selected from helium, nitrogen, argon or combinations thereof.

As in conventional MALDI sources, a focused laser is directed and fired at the matrix/analyte mixture, thereby ionizing the analyte. The ionized cloud is drawn to the ion transport guide by the potential gradient between the probe tip or sampling stage and the passageway. The ions enter the passageway and pass into the ion optics and mass analyzer/detector.

The operation of the AP-MALDI configuration and/or sampling occurs in air, helium, nitrogen, argon, oxygen, carbon dioxide, or combinations thereof, or in an inert environment selected from helium, nitrogen, argon, or combinations thereof.

Suitable mass analyzers/detectors include time-of-flight, ion trap, quadrupole, Fourier transform ion cyclotron resonance, magnetic sector, electric sector, or combinations thereof.

In one application, the laser is stationary and the at least one sample are multiple samples and the multiple samples are positioned and sequentially analyzed in an organized or a random manner.

In another application, multiple samples are contained in a multiple sample holder which is stationary and the laser is mobile and is positioned to sequentially analyze the stationary multiple samples in an organized or random manner.

The AP-MALDI configuration of this invention is operable over a broad temperature range between about −196° C. to +500° C., and preferably between about −20°and +100° C.

In one aspect, the apparatus of the claims is configured such that the mass analysis device is selected from the group consisting of an ion trap operating analyzer operating at about $10^{-5}$ Torr and a time-of-flight mass spectrometer operating at about $10^{-6}$ Torr.

The method and apparatus of the invention provide a number of advantages over conventional MALDI and related techniques:

(1) Generating MALDI ions at ambient pressure permits easier construction of a rapid sample switching device. This is an important improvement in mass spectrometry which permits rapid, high volume analysis of samples using AP-MALDI as the ionization source.

(2) The laser energy employed may be greater and more variable than for conventional MALDI-TOF systems because ions are cooled in the transport process from atmosphere to vacuum in AP-MALDI. With AP-MALDI, ion energy spreads are much lower and the signal is more intense resulting in higher sensitivity. As a result, the higher laser energy generates more analyte ions and thereby improves the sensitivity of the apparatus compared to conventional systems. Furthermore, since the performance characteristics of the laser are less critical, a lower cost laser may be employed.

(3) The relaxation of sample stage position and flatness requirements permits analysis of analyte directly from materials such as polyvinylidine difluoride (hereinafter referred to as "PVDF") membranes, polyurethane (PU) membranes, polyacrylamide gels and other materials which are commonly used in biological sample analysis. The ability to analyze samples directly from or off these materials greatly reduces sample handling and its associated cost.

(4) AP-MALDI may be used as an additional ionization source for other mass spectrometer systems. For example, a user could use either an AP-MALDI, API-ES (including nanospray) or APCI technique to analyze samples on the same mass spectrometer (mass analyzer/detector) with minimal additional capital investment. Provided the multiple ionization source mass spectrometer had a mass range to support the predominately singly charged ions generated by AP-MALDI, there would be little need for a separate MALDI-TOF instrument.

(5) Because the apparatus operates at ambient pressure, AP-MALDI is able to work with mass analyzers other than TOF, including ion trap (MS/MS) analysis. Conventional MALDI sources produce ions having a large energy spread, the lowest possible laser energy is used to produce ions. However, the trade-off is that the lower laser energy is inefficient in producing ions. Since ions are cooled in the transport process from atmosphere to vacuum in AP-MALDI, higher laser energy may be used to generate more sample ions, as discussed above. With AP-MALDI, ion energy spreads are much lower resulting in greater ion collection efficiencies and therefore higher sensitivity.

(6) The AP-MALDI source offers advantages over nanospray ESI for biopolymer identification. Nanospray ESI is a technique which provides high sensitivity and may be used to analyze limited quantities of samples because the samples are introduced into the mass spectrometer (mass analyzer/detector) at very low flow rates. Accordingly, the analyst may review the spectrum of the sample and make a decision about any further MS or MS/MS analysis which may be necessary. The major drawbacks of the nanospray ESI technique are that a high level of skill is needed to carry out the technique, it is difficult to stop and restart the analysis and sample will be consumed while the analyst is determining what further analysis may be necessary. These drawbacks may be reduced by using an AP-MALDI source because AP-MALDI is a pulse technique. As such, the analyst may generate data, analyze it and then perform additional MS or MS/MS analysis without the loss of sample. In addition, AP-MALDI may be easier to operate than conventional nanospray techniques.

Figure 2:
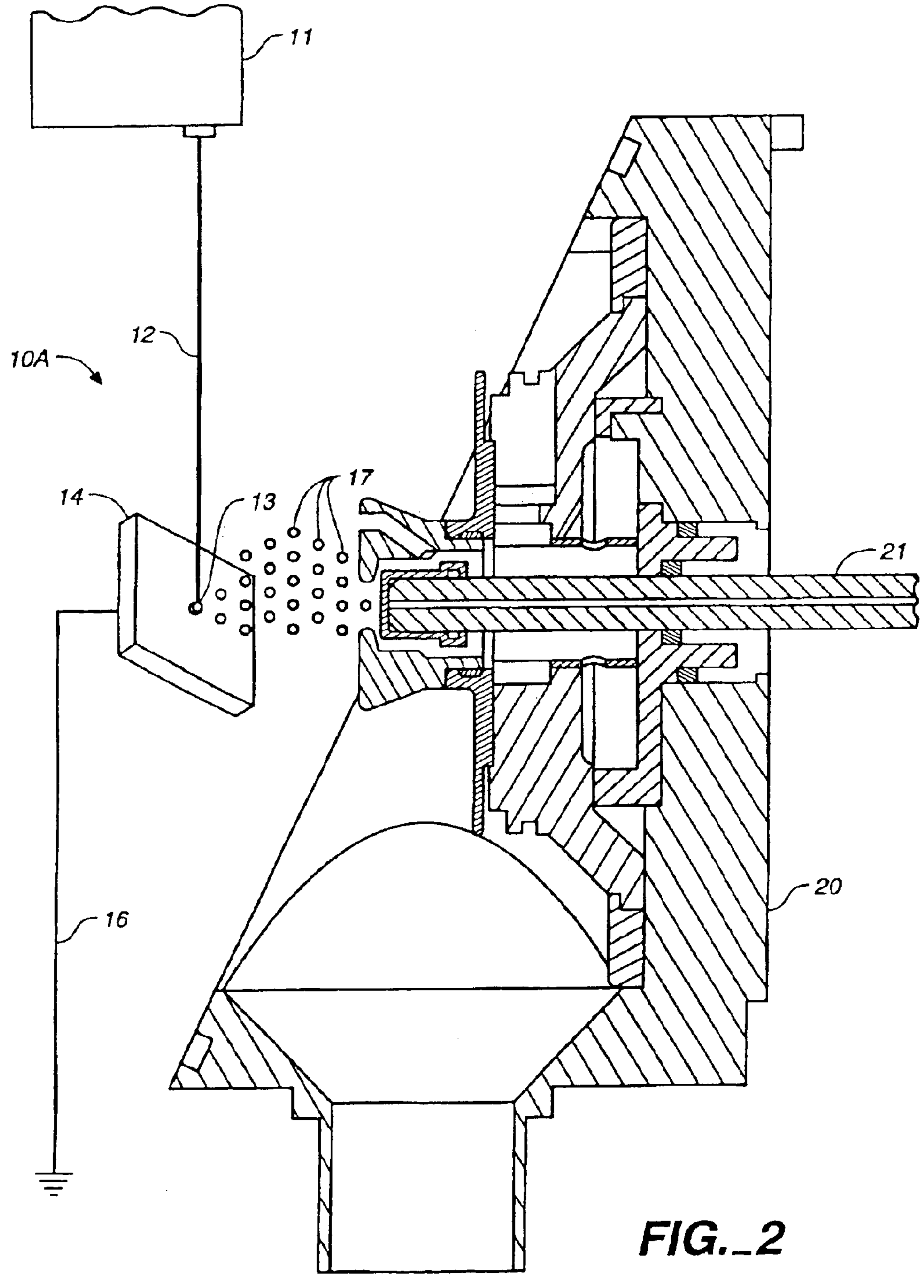
FIG. 2 shows enlarged schematic diagram of a MALDI source which operates at ambient pressure from FIG. 1.

Description of FIGS. 1 and 2

FIGS. 1 and 2 are a schematic representation of a cross section of an ambient pressure MALDI source (10A) and mass spectrometer (10B). Laser (11) is activated directing a laser beam (12) to the sample in the matrix (13) on sample holder (14), at or about ambient pressure. Sample holder (14) may be a multi-well sample plate, which is moved in an organized manner by a conventional multi-axis (XYZ) sample translation and rotation stage (15). This stage is programmable and can operate under data system control. Sample holder (14) is grounded (16). Sample in the matrix (13) is ionized producing ions (17) in the ambient pressure chamber (18) having cover (19). The atmosphere within the chamber (18) is usually air, however, conventional inert gases may be used to suppress oxidation of the analyte or portion thereof. All of these components with the exception of the laser (11) are located within the sample chamber mount (20). The ions produced pass through a dielectric capillary (21) which is usually held at several kilovolts potential, through a first skimmer (22), a lens (23) multipole ion guide (24) and a second skimmer (25) to be analyzed by a mass spectrometer (26). It should be understood that the above description is intended to illustrate and not limit the scope of the invention. Other aspects, advantages and modifications within the scope of the invention will be apparent to those skilled in the art to which the invention pertains.

The following examples are put forth so as to provide those of ordinary skill in the art with a complete disclosure and description of how to make and use the apparatus and method of the invention, and are not intended to limit the scope of what the inventors regard as their invention.

General

The equipment used for the present invention is conventional in this art. For example, many vacuum pumps are commercially available from a number of suppliers such as Edwards, One Edwards Park, 301 Ballardvale Street, Wilimington, Mass. 01887. Model EM21, double stage (2.2 $m^3h^{-1}$, 1.3 $ft^2m^{-1}$, 37 I $min^{-1}$) is a small mechanical vacuum pump which typically operates in the 1 to 100 mTorr range or higher. Another commercial supplier of suitable vacuum pumps is LABOPORT. One of skill in this art can select the pumps which will achieve the vacuum or pressure levels described herein.

EXAMPLE 1

Matrix: α-cyano-4-hydroxycinnamic acid; analyte bradykinin

As shown in FIG. 2, an AP-MALDI source was constructed from a sample stage made from a sheet of metal and held at ground potential. The sample stage was positioned approximately 5 mm opposite an atmospheric ion sampling capillary held at high voltage potential (4 kV). A focused nitrogen laser of wavelength 337 nm was directed and fired at a rate of 20 Hz at a dried spot of a matrix/sample mix on the sample stage, ionizing the matrix/sample mix.

Figure 3:
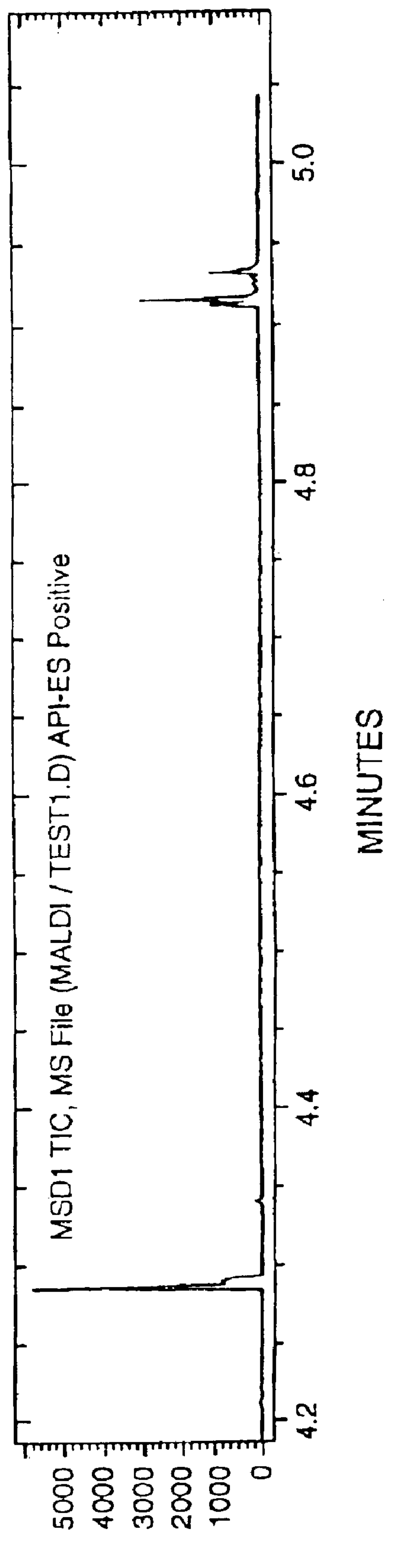
FIG. 3A shows total ion chromatogram of α-cyano-4-hydroxycinnamic acid matrix scanned from m/z 188 to m/z 192 obtained with a quadrupole mass spectrometer.
FIG. 3B is the mass spectrum of α-cyano-4-hydroxycinnamic acid obtained.
Figure 3A:
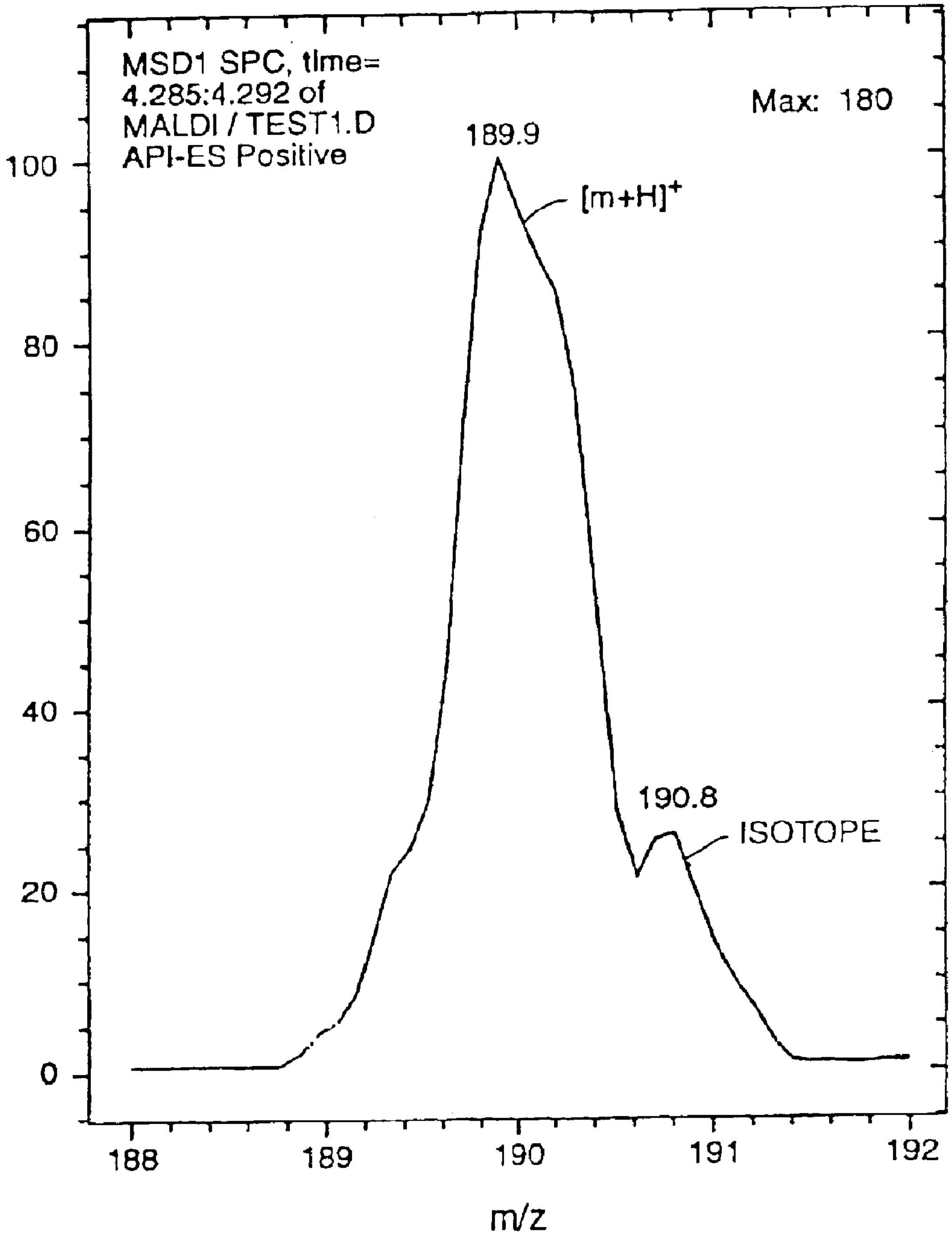
Figures 4A, 4B, 4C, 4D, 4E:
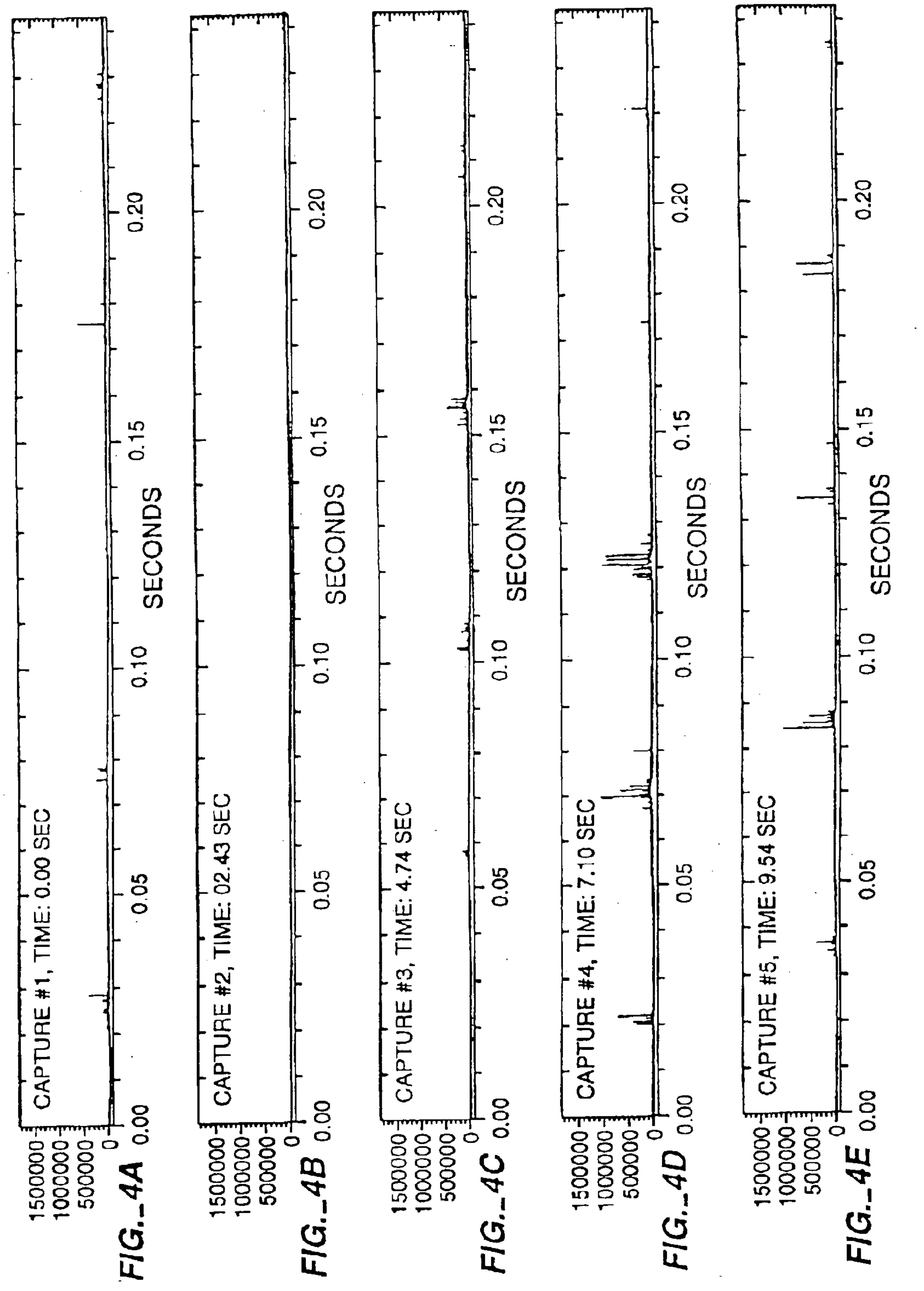
FIGS. 4A to 4J show selected ion monitoring (SIM) signal of m/z 1061 (bradykinin) obtained with a quadrupole mass spectrometer acquiring data every 25 microseconds.

To demonstrate the formation of matrix ions, a narrow scan from m/z 188 to m/z 192 was performed. The scan is shown in FIG. 3. The α-cyano matrix may be detected as a $[M+H]^+$ ion at m/z 190 (see FIG. 4). The presence of the m/z 191 isotope ($^{13}C$) confirmed that ions were generated and that the signal was not due to a noise event.

Figures 4F, 4G, 4H, 4I, 4J:
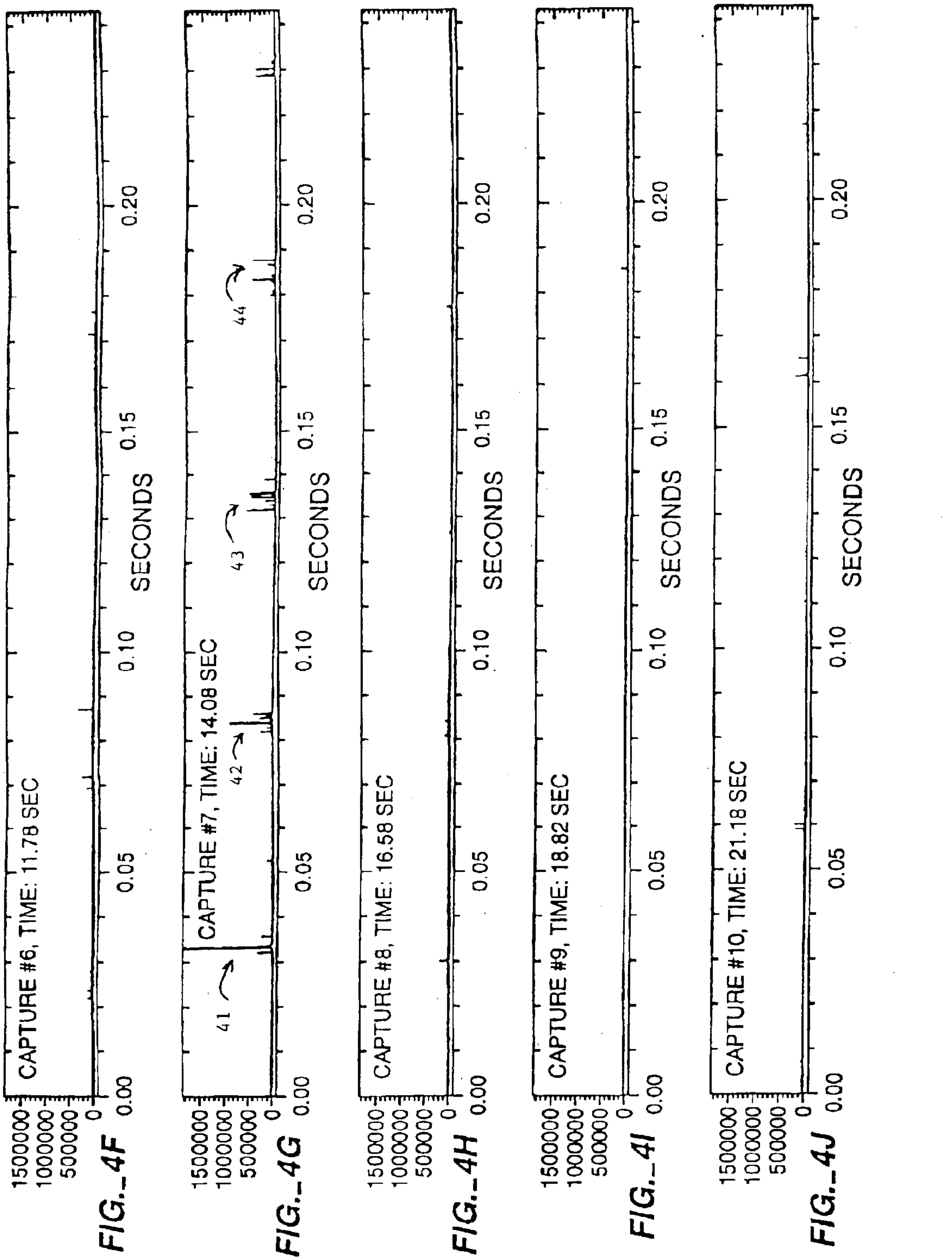
Figures 5A, 5B, 5C, 5D, 5E:
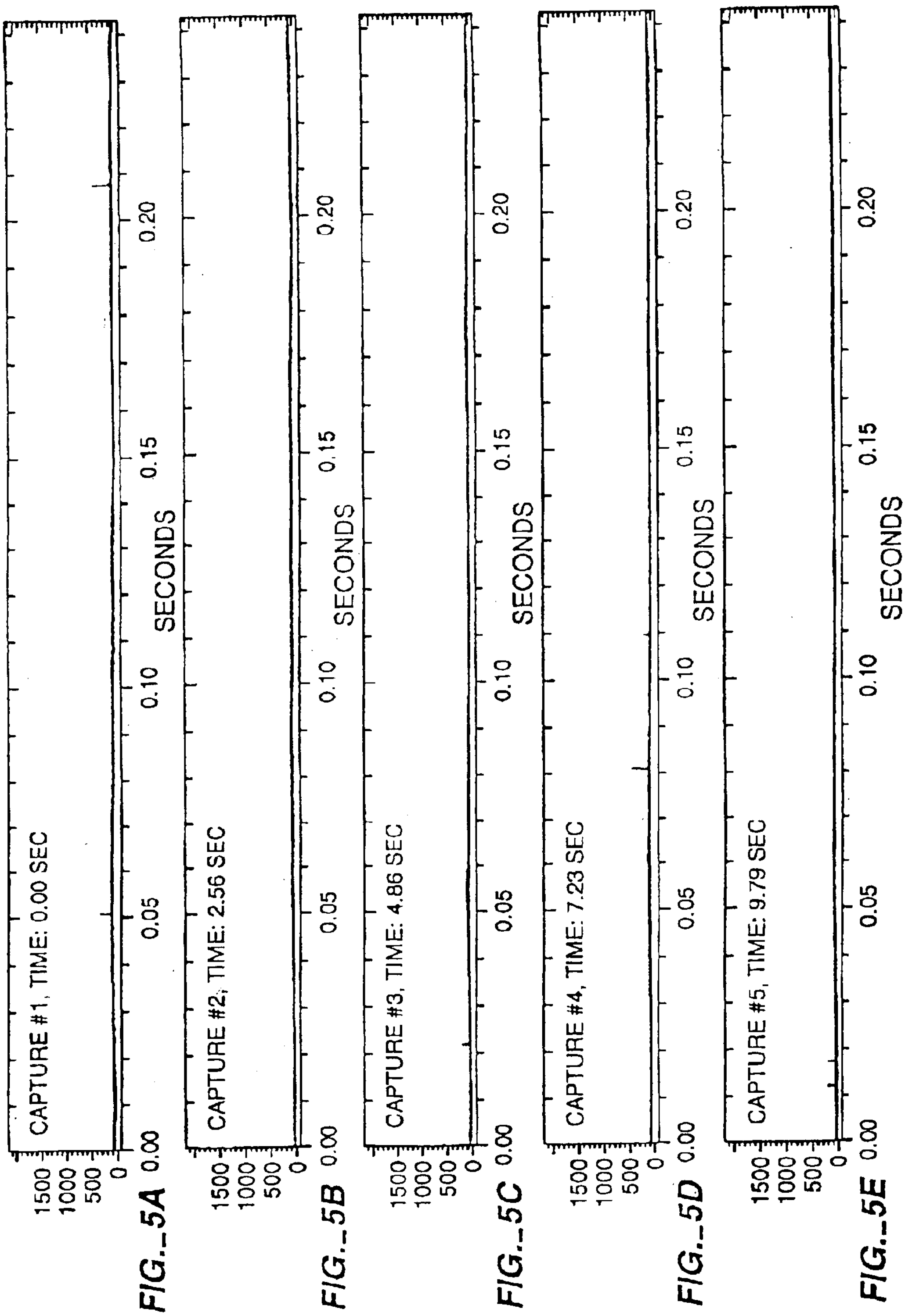
FIGS. 5A to 5J is abundance.
Figure 5F:
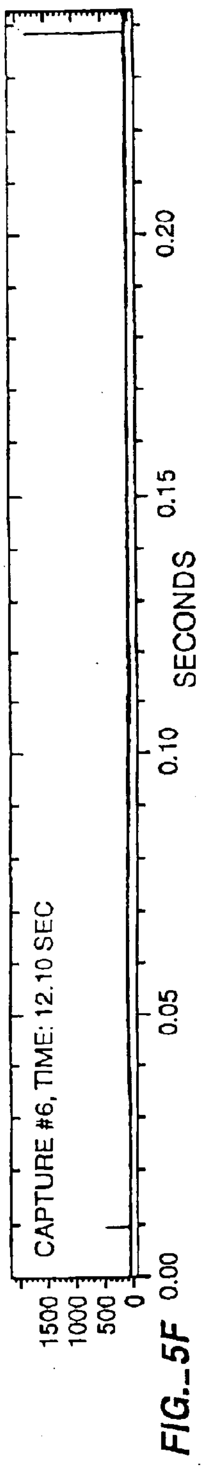
Figure 5G:
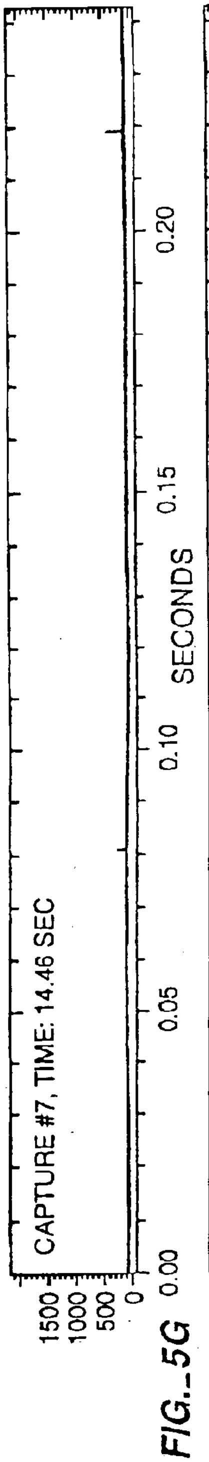
Figure 5H:
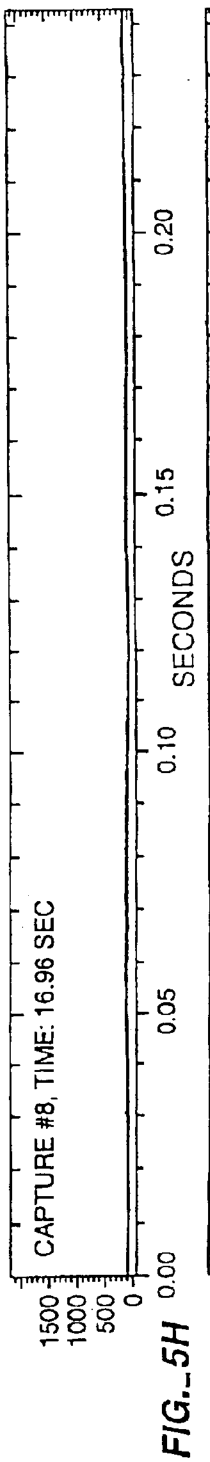
Figure 5I:
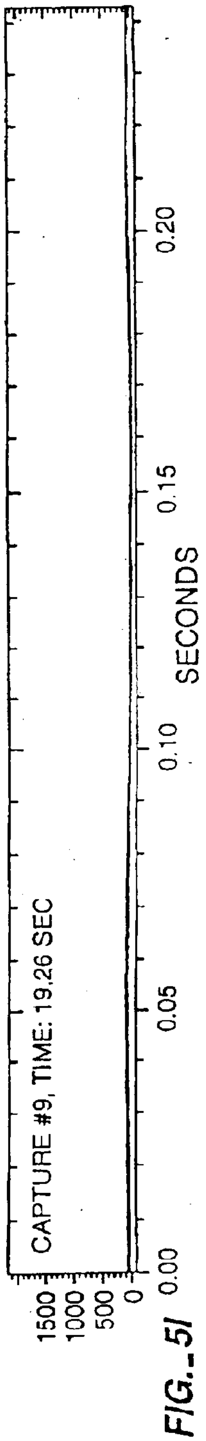
Figure 5J:
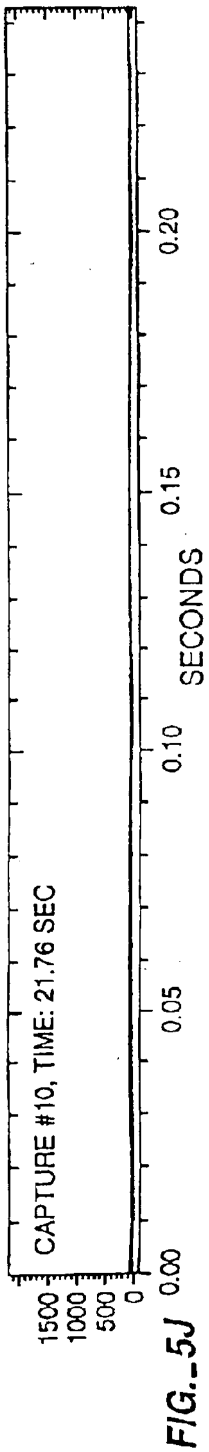

To demonstrate the formation of analyte ions (bradykinin), the quadrupole mass filter was set to transmit ions of mass-to-charge 1061 and data acquired every 25 microseconds. The data is shown in FIG. 5. Signal events substantially above background demonstrate the generation of analyte ions. To demonstrate that the signal generated at m/z 1061 was actually analyte and not an artifact, data was also acquired with the quadrupole set to transmit ions of mass-to-charge 1900. The data are shown in FIGS. 5A to 5J. The lack of a signal confirmed that the signals in FIGS. 4A to 4J was actually from the analyte and not an artifact. In FIG. 4G the laser firings are designated as 41, 42, 43, and 44 related to the [M+H]+ of bradykinin.

Figure 6A:
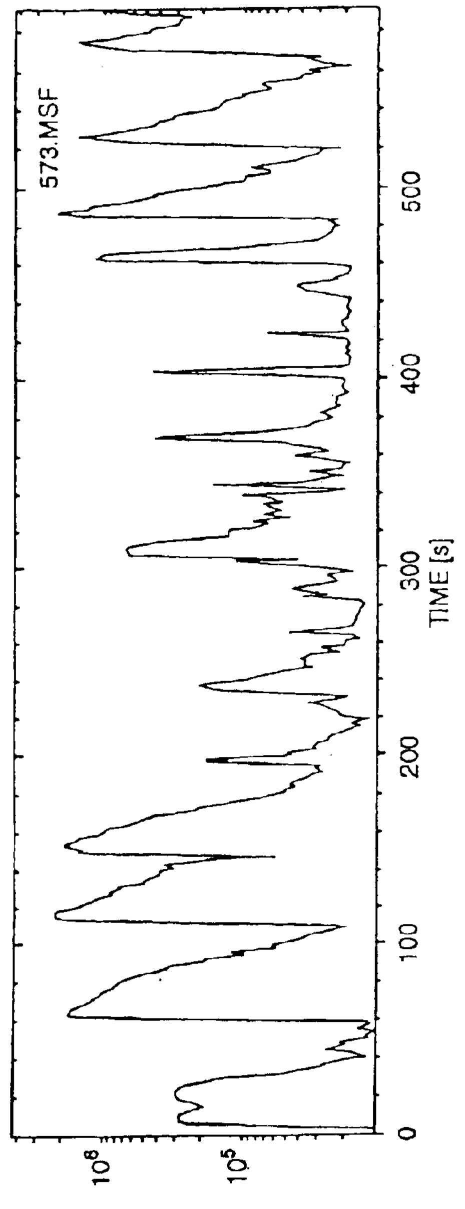
FIGS. 6A and 6B show ambient pressure MALDI data of a tryptic digest of bovine cytochrome c (14 pmoles deposited on a sample stage) obtained with an ion trap mass spectrometer.
Figure 6B:
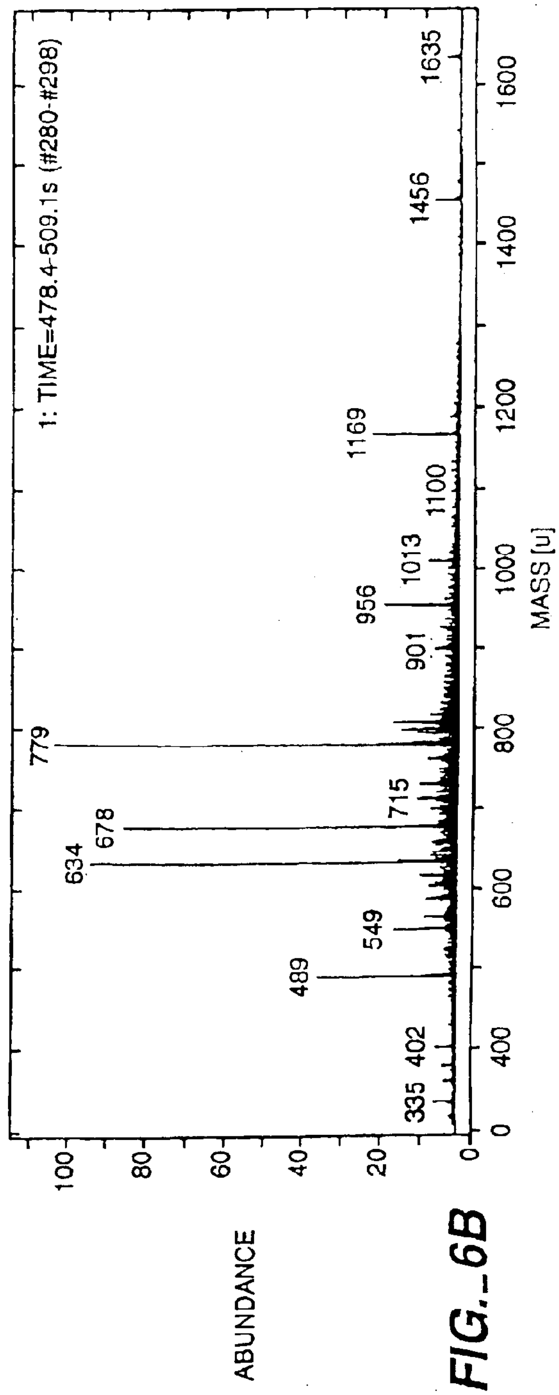

FIGS. 6A and 6B show ambient pressure MALDI data of a tryptic digest of bovine cytochrome c (14 pmoles deposited on a sample stage). FIG. 6A shows the total ion chromatogram (TIC) as the laser was moved across the sample spot. FIG. 6B shows 1.25 seconds averaged scan (m/z 300–1700) acquiring data every 250 milliseconds.

Figure 7A:
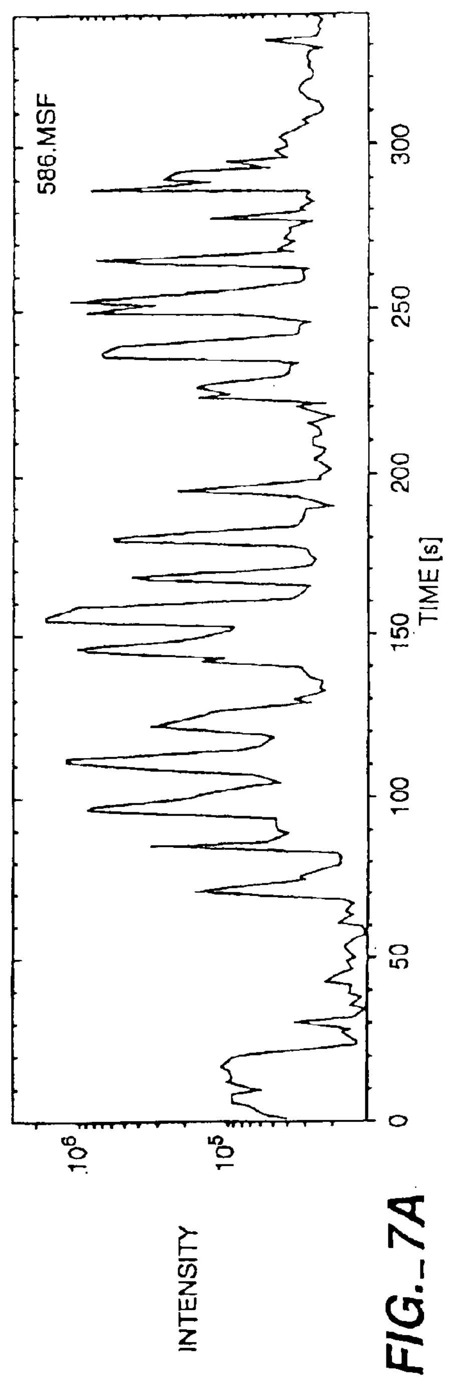
FIG. 7 shows ambient pressure MALDI data of 100 pmoles bradykinin blotted on a polyvinylidine difluoride (PVDF) membrane obtained with an ion trap mass spectrometer; (upper trace) total ion chromatogram (TIC) and (lower trace) 1.25 seconds averaged scan (m/z 300–1200) acquiring data every 250 milliseconds.
Figure 7B:
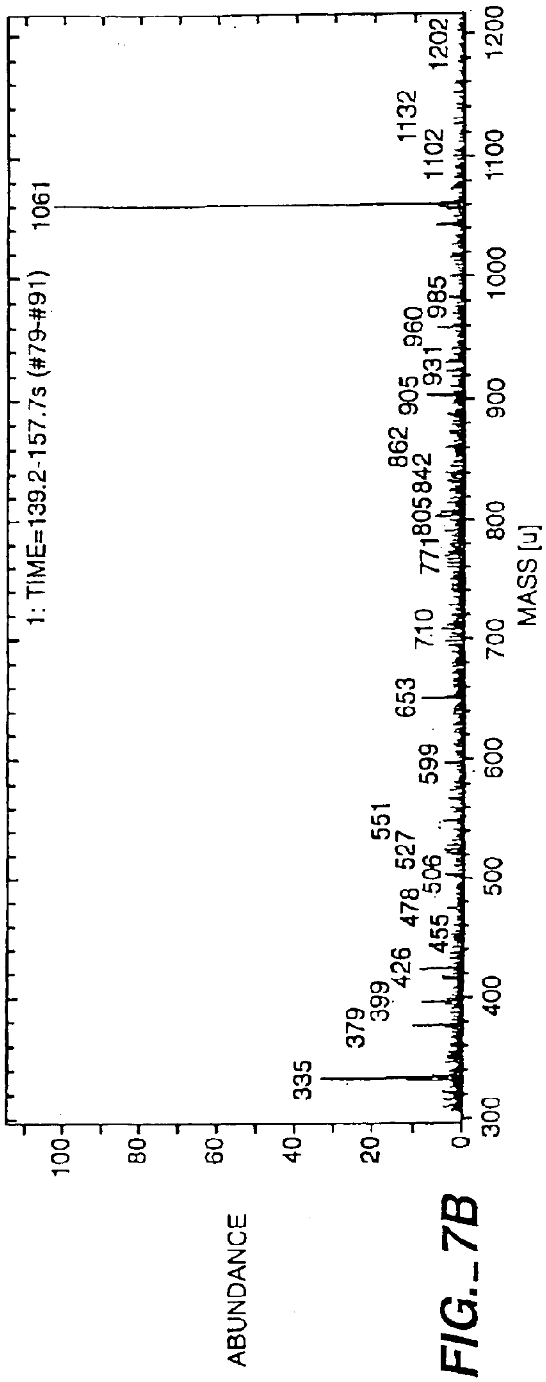

FIG. 7 shows ambient pressure MALDI data of 100 pmoles bradykinin blotted on a PVDF membrane; (upper trace) total ion chromatogram (TIC) and (lower trace) 1.25 seconds averaged scan (m/z 300–1200) acquiring data every 250 milliseconds.

While the invention has been described and illustrated with reference to specific embodiments, those skilled in the art will recognize that modification and variations may be made in the analysis of analytes in a sample in a matrix using a MALDI configuration at ambient pressure without departing from the principles of the invention as described herein above and set forth in the following claims.

We claim:

1. An ionization source for mass spectrometry comprising:

an ionization enclosure comprising means for maintaining the enclosure at a pressure greater than 100 m Torr and means for containing an analyte in a matrix within the enclosure;

a pulsed laser positioned to direct laser energy onto the matrix within the ionization enclosure, wherein the laser energy is at a wavelength absorbed by the matrix and yields simultaneous desorption and ionization of the analyte; and means for moving ions to a passageway configured to permit cooled analyte ions to enter a mass analyzer.

2. The ionization source of claim 1 wherein a flowing liquid sample comprises the analyte and the matrix.

3. The ionization source of claim 2 wherein the flowing liquid sample comprises the analyte and the matrix.

4. The ionization source of claim 2 wherein the flowing liquid sample is effluent from an HPLC, CE, or syringe pump.

5. The ionization source of claim 1 wherein the matrix is static.

6. The ionization source of claim 5 wherein the analyte contained in the static matrix is selected from the group consisting of DNA, RNA, lipids, peptides, protein, carbohydrates, fragments thereof, and combinations thereof.

7. The ionization source of claim 6 wherein the protein is digested.

8. The ionization source of claim 1 wherein the matrix and a sample are located on a holder within the ionization enclosure.

9. The ionization source of claim 8 wherein the holder is selected from the group consisting of a surface, a microtitre plate, a microchip array, a thin-layer chromatography plates, an electrophoresis gel, and a membrane, or combinations thereof.

10. The ionization source of claim 1 wherein the analyte is selected from the group consisting of DNA, RNA, lipid, peptide, protein, and carbohydrate, fragments thereof, and combinations thereof.

11. The ionization source of claim 10 wherein the protein is digested.

12. The ionization source of claim 1 wherein the pressure greater than 100 mTorr is selected from the group consisting of between 100 mTorr and 1 Torr, between 1 Torr and 760 Torr, between 1 Torr and 100 Torr, and between 100 m Torr and 760 Torr.

13. The ionization source of claim 1 wherein the ionization enclosure contains an introduced gas selected from the group consisting of helium, nitrogen, argon, oxygen and carbon dioxide.

14. The ionization source of claim 1 where the ionization source operates between −20° C. and 100° C.

15. The ionization source of claim 1 where the means for moving analyte ions to the passageway comprises a potential gradient.

16. The ionization source of claim 1 wherein the pulsed laser includes means associated with the ionization enclosure for directing the laser onto the matrix.

17. The ionization source of claim 1 wherein the means for moving ions to the passageway comprises a gas flow.

18. The ionization source of claim 17 wherein the ion transport guide comprises ion optics selected from the group consisting of a multipole ion guide, an orifice, a capillary, a skimmer, and a lens, and combinations thereof.

19. The ionization source of claim 17 wherein the passageway is connected to the ambient pressure of the ionization enclosure and a vacuum of the mass analyzer.

20. The ionization source of claim 19 wherein the mass analyzer is selected from the group consisting of ion trap, quadrupole, ion cyclotron resonance, Fourier transform ion cyclotron resource, magnetic sector, electric sector analzyers, and quadrupole time of flight analyzers, and combinations thereof.

21. The ionization source of claim 1 further comprising the passageway integrally connected to the ionization source for delivering cooled analyte ions to the mass analyzer wherein the passageway comprises an ion transport guide.

* * * * *

UNITED STATES PATENT AND TRADEMARK OFFICE

CERTIFICATE OF CORRECTION

PATENT NO. : 6,952,012 B2
APPLICATION NO. : 10/806908
DATED : October 4, 2005
INVENTOR(S) : Bai et al.

It is certified that error appears in the above-identified patent and that said Letters Patent is hereby corrected as shown below:

In column 12, lines 27-28, delete “3. The ionization source of claim 2 wherein the flowing liquid sample comprises the analyte and the matrix.”

In column 12, line 36, in Claim 6, delete “lipids” and insert -- lipid --, therefor.

In column 12, line 36, in Claim 6, delete “peptides” and insert -- peptide --, therefor.

In column 12, line 37, in Claim 6, delete “carbohydrates” and insert -- carbohydrate --, therefor.

In column 12, line 46, in Claim 9, after “membrane,” delete “or” and insert -- and --, therefor.

In column 13, line 6, in Claim 18, delete “claim 17” and insert -- claim 21 --, therefor.

Signed and Sealed this

Twenty-seventh Day of May, 2008

JON W. DUDAS
*Director of the United States Patent and Trademark Office*